United States Patent [19]
Trofimenko

[11] 3,876,675
[45] Apr. 8, 1975

[54] BIS-CHELATE DERIVATIVES OF PALLADIUM

[75] Inventor: Swiatoslaw Trofimenko, Newark, Del.

[73] Assignee: E. I. du Pont de Nemours and Company, Wilmington, Del.

[22] Filed: Aug. 17, 1971

[21] Appl. No.: 172,578

Related U.S. Application Data

[63] Continuation-in-part of Ser. No. 792,841, Jan. 21, 1969, abandoned.

[52] U.S. Cl............... 260/429 J; 106/1; 117/123 B; 260/270 R; 260/299; 260/310 R; 260/566 R; 260/429 R
[51] Int. Cl. ............................................ C07f 15/00
[58] Field of Search ..................... 260/429 R, 429 J

[56] References Cited
UNITED STATES PATENTS

| | | | |
|---|---|---|---|
| 3,385,874 | 5/1968 | Josey | 260/429 J |
| 3,450,730 | 6/1969 | Scheben et al. | 260/429 R |
| 3,458,548 | 7/1969 | Carlson | 260/429 J |

*Primary Examiner*—Arthur P. Demers

[57] ABSTRACT

This invention relates to new palladium-containing compounds, to a process for their preparation, and to formulations containing them that are useful in the preparation of palladium films on selected subsstrates. These palladium compounds have a relatively high palladium content and decompose readily under firing conditions to yield attractive metallic films useful for decorative applications.

14 Claims, No Drawings

BIS-CHELATE DERIVATIVES OF PALLADIUM

CROSS-REFERENCE TO RELATED APPLICATION

This application is a continuation-in-part of my co-pending application Ser. No. 792,841, filed Jan. 21, 1969, abandoned Aug. 20, 1971.

BACKGROUND OF THE INVENTION

To be useful in the preparation of palladium films or coatings on glass and ceramic surfaces, a palladium compound should (1) have a relatively high palladium content, (2) be stable at room temperature and preferably also up to at least about 100°C., (3) be readily soluble in common organic solvent systems of commerce, and (4) decompose readily under firing conditions to give metallic palladium. Palladium compounds used heretofore for coating such surfaces have not met one or more of these requirements. It is the purpose of this invention is to provide palladium compounds which possess these desirable properties.

SUMMARY OF THE INVENTION

The new products of this invention include palladium(II) compounds represented by the following formulas:

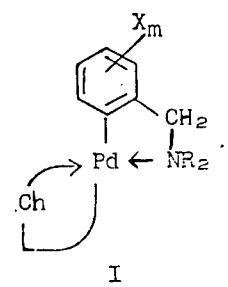

I

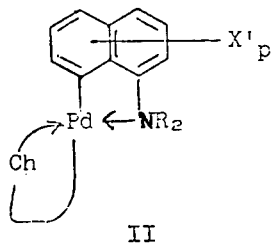

II

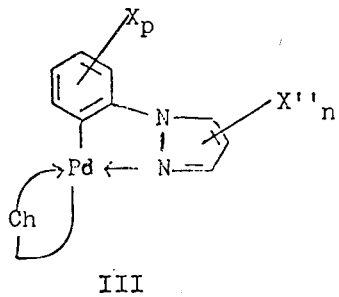

III

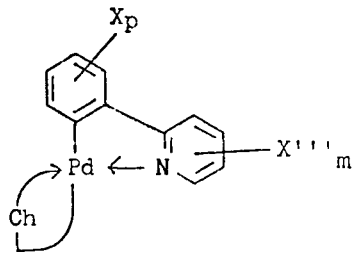

IV wherein:
Pd represents palladium in the +2 oxidation state, i.e., palladium with a formal valence of two, i.e., palladium(II);
R is lower alkyl, the two R groups attached to any one nitrogen atom being the same or different and preferably the same, and at least one R group being bonded to nitrogen through a carbon bonded to at least two hydrogens, i.e., a primary alkyl group;
X is lower alkyl, lower alkoxy, F, Cl, or Br;
$m$ is 0, 1, or 2;
X' is Cl or Br;
$p$ is 0 or 1;
X'' is Cl, Br, lower alkyl, or phenyl;
$n$ is 0, 1, 2, or 3;
X''' is lower alkyl, lower alkoxy, or phenyl; and
Ch is a monovalent, bidentate chelate ligand formed by removal of an acidic hydrogen from a beta-diketone, a beta-keto aldehyde, a beta-keto ester, a mono or bis (hydrocarbylimino) derivative of a beta-diketone, beta-keto aldehyde, or beta-keto ester, a tropolone, an aminotroponeimine, or a salicylaldimine.

Ch has up to and including 30 carbon atoms. "Lower alkyl" groups are alkyl groups having up to and including 8 carbon atoms, and "lower alkoxy" groups have the formula "—OR," where R are such lower alkyl groups of up to and including 8 carbon atoms.

The bonds joining the various X groups to the carbocyclic ring systems indicate, in the usual way, that the X's can be bonded to any carbon or carbons of the ring not already substituted.

Except when it is derived from a tropolone, an aminotroponeimine or a salicylaldimine, the portion of the molecule represented as Ch in formulas I–IV can thus be represented in more detail by formulas V, VI, or VII (the palladium atom is also shown):

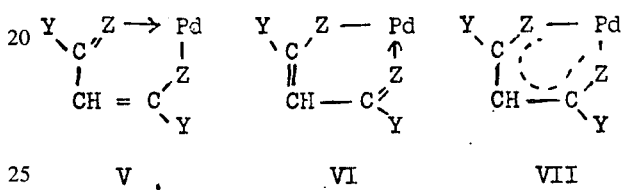

V,    VI    VII wherein:
Z is O or NR', R' being lower alkyl, aryl, or substituted aryl; the two Z groups in a given molecule can be the same or different; and preferably at most one Z is NR'; and
the Y groups in a single molecule are the same or different and are hydrogen, alkyl, cycloalkyl, lower fluoroalkyl, aryl, heterocyclyl (a monovalent radical or group derived from a heterocyclic molecule by removal of a hydrogen from a nuclear atom thereof) containing 5–6 nuclear atoms, alkoxy, aryloxy, or aralkoxy, at most one of them being hydrogen, alkoxy, aryloxy, or aralkoxy. The aryl and heterocyclyl Y groups can contain inert substituents such as halo, lower alkyl, and lower alkoxy.

One skilled in the art will recognize that formulas V, VI, and VII are equivalent and are different ways of representing a chelate ligand Ch as defined above. Formulas V and VI are classical representations in which an arbitrary distinction is made between coordinate and covalent bonds joining the Z groups and the palladium, whereas formula VII is a more modern representation in which a distinction between different kinds of localized bonds is not made. One skilled in the art will also recognize that when the Y groups in a given molecule are different, two isomers of the compound will be possible.

One skilled in the art will also readily see from the description so far given that the new compounds are bischelate derivatives of palladium(II). One of the chelating ligands will be arbitrarily referred to as the "arylamino" portion of the molecule. This is the portion above and to the right of the Pd atom in each of formulas I–IV. The other chelating ligand will be arbitrarily referred to as the "chelate" portion and is the Ch portion, already discussed, below and to the left of the Pd atom in formulas I–VII. Of the two "formal valences" of the palladium(II) atom, one is satisfied by an arylpalladium (C-Pd) bond emanating from the aryl group of the aryl-amino portion; the other is satisfied by a Z-Pd bond emanating from one of the Z entities of the chelate portion.

DESCRIPTION OF THE PREFERRED EMBODIMENTS

The products of formulas I–IV are made by reacting a dimeric arylpalladium(II) halide (usually a chloride or bromide) in which the aryl group is an aryl-amino group as represented in formulas I–IV, with a compound Ch—H, in which Ch is as defined above and which is a compound capable of forming a monovalent, bidentate chelate linkage with a metal. An example of such an arylpalladium(II) halide dimer is dimeric 2-(dimethylaminomethyl)phenylpalladium(II) chloride,

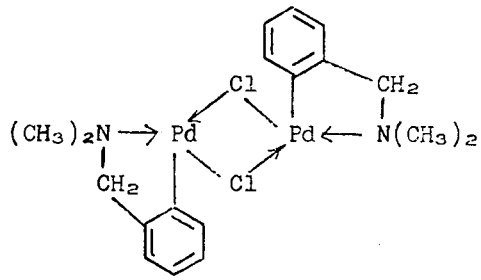

VIII in which the organic moieties correspond to the aryl-amino portion of formula I.

The preparation of metal chelates, in which one or more Ch groups as defined above are bonded to a metal, from metal halides and the parent Ch—H, is well known to those skilled in the art. Various embodiments of the process are reviewed, for example, in "Inorganic Syntheses," Vol. II, Ed. Fernelius, pp. 10–20 ff. (McGraw-Hill, 1946) and Vol. XI, Ed. Jolly, pp. 72–82 ff. (1968). Preparations of individual metal chelates are scattered throughout the chemical literature, and references to some of these publications are given in "Inorganic Syntheses."

The palladium(II) chelates of the present invention can be prepared, for example, by reaction of a halide of the type illustrated by formula VIII with (a) a compound Ch—H in the presence of a base or (b) a preformed metal salt of a compound Ch-H, in which the H is replaced by one equivalent of a metal. The base can be, for example, a hydroxide, oxide, or carbonate of an alkali metal or it can be ammonia, a primary, secondary, or tertiary alkylamine, or a quaternary ammonium hydroxide. Both these methods are mentioned in "Inorganic Syntheses." If a performed salt is used, it is usually an alkali-metal salt or a thallium salt.

In preparing the products of this invention, it is convenient to use a solvent such as dimethylformamide or a di(lower alkyl)amide of a lower alkanecarboxylic acid. Alternatively, a lower alkanenitrile such as acetonitrile or propionitrile, a lower alkanone such as acetone or methyl ethyl ketone, or other solvents such as dimethyl sulfoxide or methylene chloride can be used. The products are soluble in such solvents, and thus the initial reaction mixture need not be homogeneous. The preferred temperature is in the range 30°–80°C. Higher temperatures should be used with caution, since reduction of the palladium to palladium metal may take place. Temperatures as low as about −20°C. can be used, but no advantage results, and the reaction may be unnecessarily slow. The palladium(II) chelates are all insoluble in water and can be readily isolated as solids by diluting the reaction mixtures with excess water. They can then be separated by filtration or extracted with a water-immiscible liquid such as methylene chloride. They can be purified by conventional procedures such as chromatography or recrystallization from common solvents.

The new palladium(II) chelates of this invention are colorless or pale-yellow crystalline solids that are thermally stable to well over 100°C. They dissolve readily in many commercial organic solvents, e.g., aromatic hydrocarbons and chlorinated aliphatic and aromatic hydrocarbons. They are also somewhat soluble in aliphatic hydrocarbons. They are stable indefinitely to ordinary atmospheric conditions and in storage. As shown in Example 11, they decompose smoothly at higher temperatures to give metallic palladium.

The following examples illustrate certain embodiments of this invention. In these examples and elsewhere in the specification, all parts, ratios and percentages of materials or components are by weight. The arylpalladium(II) halide dimers used as reactants to prepare products of the invention were obtained as follows.

EXAMPLE A 2-(3,5-Dimethyl-1-pyrazolyl)phenylpalladium(II) Chloride Dimer

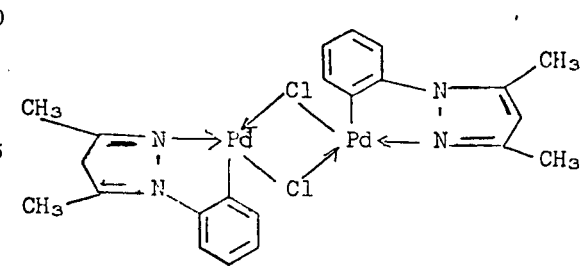

3,5-Dimethyl-1-phenylpyrazole (1.9 g.) was added with stirring to a mixture of 3.26 g. of $K_2PdCl_4$, 200 ml. of water, and 50 ml. of methanol. The mixture was stirred at 68°C. for 4 hours and then at room temperature overnight. The pale orange-gray solid that had precipitated was separated by filtration, washed with water, washed with methanol and dried. The yield was 3.2 g.

EXAMPLE B 2-(1-Pyrazolyl)phenylpalladium(II) Chloride Dimer

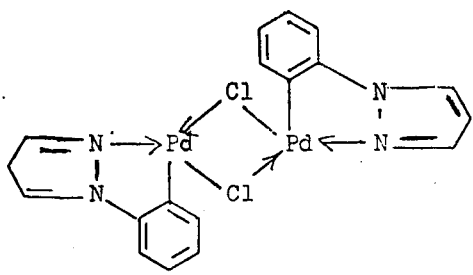

A solution of Na₂PdCl₄ was prepared by stirring overnight at room temperature a mixture of 17.7 g. of PdCl₂, 12 g. of NaCl, 500 ml. of methanol and 25 ml. of water. The resulting reddish-brown solution was 0.19 M in Na₂PdCl₄.

A mixture of 100 ml. of this solution and 0.02 mole (2.9 g.) of 1-phenylpyrazole was heated at 60°C. with stirring for 1 hour and cooled. The yellow solid that precipitated was separated by filtration, washed with water and with methanol, and dried. The yield was 5.8 g.

Anal. Calcd. for (C₉H₇ClN₂Pd)₂:
C, 37.9; H, 2.46; Cl, 12.45; N, 9.83; Pd, 37.3
Found: C, 41.15; H, 2.49; Cl, 13.5; N, 10.3; Pd, 28.1.
C, 41.52; H, 2.84; N, 10.5;

The analytical results indicate contamination of the dimer by bis(1-phenylpyrazole)palladium dichloride, i.e., an incomplete reaction. The contamination can be eliminated by running the reaction longer than one hour.

Alternatively, the contaminant can be removed by extraction with hot chloroform, followed by recrystallization of the desired product. For example, 24 g. of crude dimer was stirred with 300 ml. of refluxing chloroform, and the hot mixture was filtered. The solid that did not dissolve in the chloroform was extracted again with chloroform as above and then recrystallized from chlorobenzene. Analysis showed that pure dimer was thus obtained.

Anal. Found: C, 37.8; H, 2.40; N, 9.75; Pd, 37.03.

The dimer can be further characterized by reacting it with a phosphine such as triphenylphosphine and analyzing the resulting derivative.

EXAMPLE C 2-(2-Pyridyl)phenylpalladium(II) Chloride Dimer

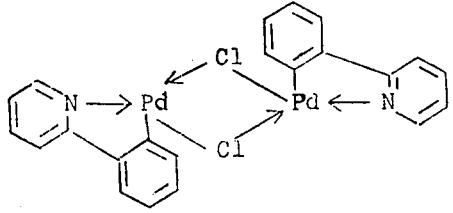

The procedure of Example A was essentially repeated, with 1.7 g. of 2-phenylpyridine in place of the 3,5-dimethyl-1-phenylpyrazole. The yield of dimer was 3.1 g. For characterization, the dimer was converted to its tris(p-tolyl) phosphine derivative. A mixture of the dimer, 3.04 g. of tris(p-tolyl)phosphine, and 50 ml. of dimethylformamide was warmed with stirring until the solids dissolved. This occurred rapidly at about 50°C. The solution was cooled and poured into 400 ml. of water. The solid that precipitated was purified by chromatography on alumina (both the solvent and the eluent were methylene chloride), followed by recrystallization from toluene. The phosphine complex gradually decomposed on heating above about 227°C.

Anal. Calcd. for (C₃₂H₂₉ClNPPd)₂:
C, 64.0; H, 4.84; Cl, 5.82; N, 2.33; P, 5.17
Found: C, 63.9; H, 4.18; Cl, 5.74; N, 2.24; P, 5.32.
C, 63.8; H, 4.56; N, 2.31

The nmr (nuclear-magnetic-resonance) spectrum was in accord with the structure shown above.

8-(Dimethylamino)-1-naphthylpalladium(II) chloride dimer was prepared by the method of Cope and Friedrich, J. Am. Chem. Soc., 90, 909 (1968).

2-(Dimethylaminomethyl)phenylpalladium(II) chloride dimer was also prepared by the procedure of Cope and Friedrich.

EXAMPLE 1

2,2,6,6-Tetramethyl-3,5-heptanedionato-2-(2-pyridyl)phenylpalladium(II)

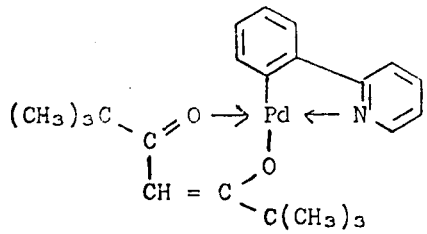

To a stirred mixture of 0.3 g. of 2-(2-pyridyl)-phenylpalladium(II) chloride dimer and 50 ml. of dimethylformamide was added 2.85 g. of an equimolar mixture of 2,2,6,6-trimethyl-3,5-heptanedione and diethylamine. The mixture was stirred at 50°C. for 1 hour, cooled, and poured into 300 ml. of water. The solid that precipitated was separated by filtration, dried, dissolved in methylene chloride, and purified by chromatography on alumina (methylene chloride eluent). The off-white crystals thus obtained were further purified by recrystallization from heptane to give 2.6 g. (59%) of 2,2,6,6-tetramethyl-3,5-heptanedionato-2-(2-pyridyl)phenylpalladium(II), m.p. 226°–227°C. with decomposition.

Anal. Calcd. for C₂₂H₂₇NO₂Pd: C, 59.6; H, 6.09; N, 3.16
Found: C, 59.97; H, 5.98; N, 3.34.

The nmr spectrum was in accord with the structure shown above, with a doublet (J = 6) at 1.78τ, a multiplet at 2.1–3.1τ, and singlets at 4.24τ, 8.72τ, and 8.76τ, in the correct 1:7:1:9:9 ratio.

EXAMPLE 2

2,2,6,6-Tetramethyl-3,5-heptanedionato-2-(1-pyrazolyl)phenylpalladium(II)

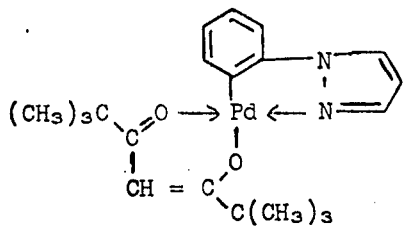

The procedure of Example 1 was essentially repeated, except that 0.01 mole (2.8 g.) of 2-(1- pyrazolyl)phenylpalladium(II) chloride dimer was used in place of the 2-pyridyl compound. After purification by chromatography, creamy-white crystals of 2,2,6,6-tetramethyl-3,5-heptanedionato-2-(1-pyrazolyl)phenylpalladium(II) melting at 152°–153°C. were obtained. The product was very soluble in benzene and fairly soluble in heptane. It was recrystallized from heptane. The nmr spectrum was in accord with the above structure, with a doublet (J = ~2.7) at 2.17τ, a doublet (J = ~1.8) at 2.33τ, a multiplet at 2.4–2.5τ, a multiplet at 2.9–3.0τ, a triplet (J = ~2.5) at 3.65τ, and singlets at 4.23τ, 8.72τ, and 8.76τ in the correct 1:1:1:3:1:1:9:9 ratio.

An elemental analysis was run on a separate sample, prepared by essentially the foregoing method on a larger scale and recrystallized from 95% ethyl alcohol.

Anal. Calcd. for $C_{20}H_{26}N_2O_2Pd$: C, 55.65; H, 6.03; N, 6.49

Found: C, 55.67; H, 5.88; N, 6.69.

The product of this example was also prepared in 82% yield by reaction of 2-(1-pyrazolyl)phenylpalladium(II) chloride dimer with the thallium salt of 2,2,6,6-tetramethyl-3,5-heptanedione in dimethylformamide.

EXAMPLE 3

2,2,6,6-Tetramethyl-3,5-heptanedionato-8-(dimethylamino)-1-naphthylpalladium(II)

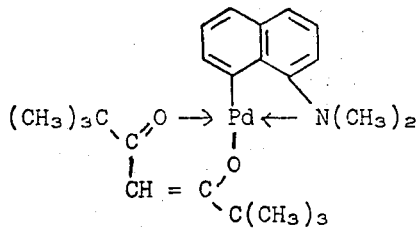

The procedure for Example 1 was essentially repeated except that 0.01 mole (3.1 g.) of 8-(dimethylamino)-1-naphthylpalladium(II) chloride dimer was used in place of the 2-pyridyl compound. Following purification by chromatography, the product was washed with methanol. There was thus obtained 3.6 g. (79%) of crystalline 2,2,6,6-tetramethyl-3,5-heptanedionato-8-(dimethylamino)-1-naphthylpalladium(II) that melted at 206°–207°C. with decomposition.

Prior to analysis the product was recrystallized from a mixture of toluene and heptane.

Anal. Calcd. for $C_{23}H_{31}NO_2Pd$: C, 60.1; H, 6.75; N, 3.05

Found: C, 60.63; H, 7.10; N, 3.11
C, 60.79; H, 7.35; N, 3.14.

The nmr spectrum was in accord with the above structure, with an aromatic multiplet 2.3–2.9 and singlets at 4.23τ, 6.67τ, 8.67τ, and 8.76τ in the correct 6:1:6:9:9 ratio.

EXAMPLE 4

2,4-Pentanedionato-2-(1-pyrazolyl)phenylpalladium(II)

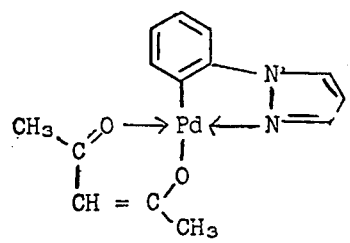

The procedure of Example 1 was essentially repeated except that an equivalent amount of an equimolar mixture of 2,4-pentanedione and triethylamine was used in place of the 2,2,6,6-tetramethyl-3,5-heptanedione and diethylamine. The pale-yellow crystalline 2,4-pentanedionato-2-(1-pyrazolyl)phenylpalladium(II) thus obtained decomposed gradually on heating above about 225°C. It was characterized by its infrared absorption spectrum.

EXAMPLE 5

2,2,6,6-Tetramethyl-3,5-heptanedionato-2-(dimethylaminomethyl)phenylpalladium(II)

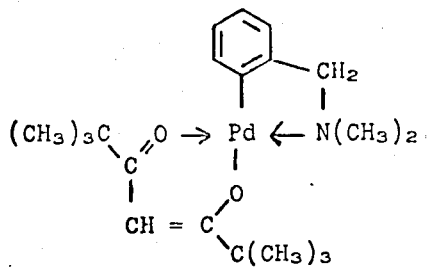

To a solution of 2.7 g. of 2-(dimethylaminomethyl)phenylpalladium(II) chloride dimer in 25 ml. of dimethylformamide was added 3.0 g. of an equimolar mixture of 2,2,6,6-tetramethyl-3,5-heptanedione and diethylamine. The mixture was stirred at 50°C. for 15 minutes and poured into 200 ml. of ice and water. The solid that precipitated was separated by filtration, dried, dissolved in methylene chloride, and purified by chromatography on alumina (methylene chloride eluent). There was thus obtained 2.1 g. (50%) of crystalline 2,2,6,6-tetramethyl-3,5-heptanedionato-2-(dimethylaminomethyl)phenylpalladium(II). The nmr spectrum was in accord with the above structure, with a multiplet at 2.5–3.2τ and singlets at 4.32τ, 6.10τ, 7.18τ, 8.78τ, and 8.85τ in the correct 4:1:2:6:9:9 ratio.

EXAMPLE 6

2,2,6,6-Tetramethyl-3,5-heptanedionato-2-(3,5-dimethyl-1-pyrazolyl)phenylpalladium(II)

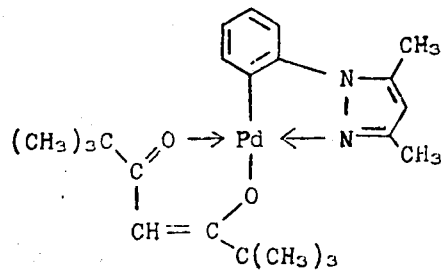

The procedure of Example 1 was essentially repeated, except that 0.01 mole (3.0 g.) of 2-(3,5-dimethyl-1-pyrazolyl)phenylpalladium(II) chloride dimer was used in place of the 2-pyridyl compound. After purification by chromatography, 2,2,6,6-tetramethyl-3,5-heptanedionato-2-(3,5-dimethyl-1-pyrazolyl)phenylpalladium(II) was obtained in 68% yield as a pale-creamy crystalline solid. Recrystallization from heptane gave fine white needles melting at 199°–200°C. The nmr spectrum was in accord with the above structure with multiplets at 2.4τ and 3.03τ and singlets at 4.9τ, 4.26τ, 7.53τ, 8.76τ, and 8.44τ in the correct 1:3:1:1:6:9:9 ratio.

EXAMPLE 7

2,4-Pentanedionato-(2-dimethylaminomethyl)phenyl-palladium(II)

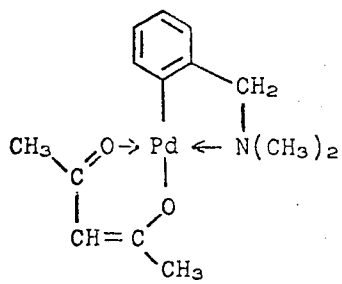

To 400 ml. of 0.19-molar Na₂PdCl₄ in aqueous 95% methanol (cf. Example B) was added 22 g. of N,N-dimethylbenzylamine, and the mixture was stirred for 48 hours at room temperature. The yellow solid that precipitated was separated by filtration, washed with water and with methanol, and air-dried. The solid was stirred with 200 ml. of dimethylformamide, and 17 g. of an equimolar mixture of 2,4-pentanedione and trimethylamine was added. This mixture was stirred at 50°C. for 20 minutes and poured into 400 ml. of water. The solid that precipitated was separated by filtration and purified by chromatography (methylene chloride solvent and eluent). There was thus obtained 19 g. (74%) of 2,4-pentanedionato-(2-dimethylaminomethyl)phenylpalladium(II) as a crystalline solid. After recrystallization from heptane the product melted at 139°–140°C.

Anal. Calcd. for $C_{14}H_{19}NO_2Pd$: C, 49.65; H, 5.61; N, 4.13

Found: C, 49.4; H, 5.81; N, 4.07
C, 49.2; H, 5.95; N, 4.09.

The nmr spectrum was in accord with the above structure with a multiplet at 2.5–3.2τ and singlets at 4.65τ, 6.08τ, 7.18τ, 7.96τ, and 8.03τ in the correct 4:1:2:6:3:3 ratio.

EXAMPLE 8

(Ethyl 3-oxobutanoato)-2-(1-pyrazolyl)phenylpalladium(II)

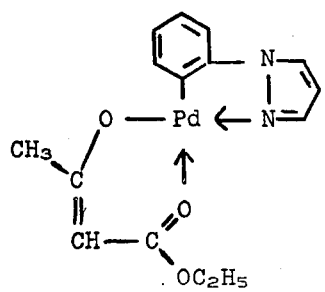

To 5.7 g. of 2-(1-phenylpyrazolyl)palladium(II) chloride dimer in 50 ml. of dimethylformamide was added a mixture of 2.6 g. of ethyl 3-oxobutanoate (ethyl acetoacetate) and 2.6 g. of diisopropylethylamine. The reaction mixture was stirred at 60°C. for 15 minutes and poured into 300 ml. of ice-cold water. The product was extracted with methylene chloride and purified by chromatography on alumina, being eluted mainly with methylene chloride and near the end with acetone. After stripping of solvent, trituration with methanol, and drying, there was obtained 3.2 g. (43%) of crystalline (ethyl 3-oxobutanoato)-2-(1-pyrazolyl)phenylpalladium(II) melting at 153°–154°C. with decomposition. The nmr was in accord with the above structure, with a doublet (J = 2.1) at 2.24τ, multiplets at 2.30τ and 2.77τ, a triplet (J = 2.5) at 3.43τ, a singlet at 4.99τ, a quadruplet (J = 7) at 5.55τ, a singlet at 7.81τ, and a triplet (J = 7) at 8.55τ, in the correct 1:1:1:3:1:1:2:3:3 ratio.

EXAMPLE 9

(Ethyl 3-oxobutanoato)-2-(dimethylaminomethyl)phenylpalladium(II)

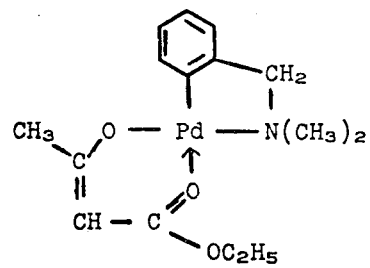

A mixture of 11 g. of 2-(dimethylaminomethyl)phenylpalladium(II) chloride dimer, 9.5 g. of diisopropylethylamine, and 10 g. of ethyl 3-oxobutanoate in 100 ml. of dimethylformamide was stirred at 50°C. for 1 hour and poured into 500 ml. of water. The product was extracted and purified by chromatography as in Example 8 to give 12 g. (79%) of crystalline (ethyl 3-oxobutanoato)-2-(dimethylaminomethyl)-phenylpalladium(II). After recrystallization from heptane, the product melted at 156°–158°C. with decomposition.

Anal. Calcd. for $C_{15}N_{21}NO_3Pd$: C, 48.8; H, 5.70; N, 3.80; M.W., 369

Found: C, 48.8; H, 5.71; N, 3.97; M.W., 372 (osmom.. in CHCl₃).

The nmr spectrum was in accord with the above structure, with multiplets centered around 2.60τ and 2.9τ, a singlet at 5.12τ, a quadruplet (J = 7) at 5.84τ, singlets at 6.02τ, 7.12τ, and 7.92τ and a triplet (J = 7) at 8.65τ, in the correct 1:3:1:2:2:6:3:3 ratio.

EXAMPLE 10

(4-Phenylimino-2-pentanonato)-2-(dimethylaminomethyl)-phenylpalladium(II)

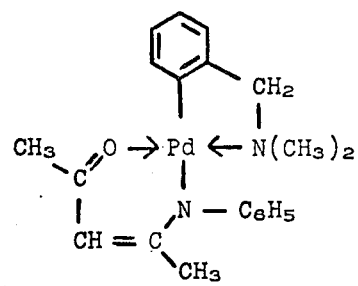

A mixture of 8.4 g. of 2-(dimethylaminomethyl)-phenylpalladium(II) chloride dimer, 8.1 g. of 4-phenylimino-2-pentanone, and 6 g. of diisopropylethylamines in 100 ml. of dimethylformamide was stirred at 50°C. for 1 hour and poured into 400 ml. of water. The product was extracted and purified by chromatography as in Example 8, to give 8.2 g. (68%) of crystalline (4-phenylimino-2-pentanonato)-2-(dimethylaminomethyl)phenylpalladium(II) melting at 164°–166°C. Recrystallization from heptane raised the melting point to 171°–172°C. with decomposition.

Anal. Calcd. for $C_{20}H_{24}N_2OPd$: C, 57.9; H, 5.78; N, 6.76

Found: C, 57.7; H, 5.75; N, 6.78.

The nmr spectrum was in accord with the above structure, with a sharp multiplet at 2.88τ, a complex multiplet at 2.5–3.8τ, a doublet (J = 7) at 4.34τ, and singlets at 4.94τ, 6.10τ, 7.35τ, 7.99τ, and 8.26τ, in a 5:3:1:1:2:6:3:3 ratio.

Scope of the "Aryl-amino" Portion of the Molecule

In addition to the products of Examples 5 and 7, other 2-(dialkylaminomethyl)phenylpalladium(II) chelates are included among products of the invention corresponding to formula I. Thus, other dialkylbenzylamines corresponding to the aryl-amino portion of formula I can be converted to the palladium(II) chloride or bromide dimers by methods described in the literature and in Examples A, B, and C, and the dimeric halides can be substituted for the 2-(dimethylaminomethyl)phenylpalladium(II) chloride dimer in Examples 5 and 7 to give products of the invention. They can also be reacted with any of the chelate precursors, Ch—H, described above, to give products of the invention. Examples of other operable dialkylbenzylamines are N,N-diisobutylbenzylamine, N-isopropyl-N-methylbenzylamine, 5-isopropyl-N,N,2-trimethylbenzylamine, N,N,4-trimethylbenzylamine, N,N-diethyl-4-isopentyloxybenzylamine, 3,5-dimethoxy-N,N-dimethylbenzylamine, N,N-diethyl-3-methoxybenzylamine, 4-butoxy-N-ethyl-N-methylbenzylamine, N,N-diethyl-2-fluorobenzylamine, 4-bromo-N,N-dimethylbenzylamine, 5-chloro-N,N-dimethylbenzylamine, 2-bromo-4-methoxy-N,N-dimethylbenzylamine, 3-chloro-N,N,2-trimethylbenzylamine, and 5-methoxy-N,N,2-trimethylbenzylamine. Preferably, because of availability of intermediates, $m$ is 0 or 1 in formula I. Most preferably, $m$ is 0.

Similarly, other N,N-dialkyl-1-naphthylamines can be converted to the corresponding palladium(II) chloride or bromide dimers, and these can be substituted for the 8-dimethylamino-1-naphthylpalladium(II) chloride dimer in the process of Example 3 to give products of the invention in which the aryl-amino portion of the molecule corresponds to that of formula II. Examples of other operable N,N-dialkyl-1-naphthylamines are N-ethyl-N-methyl-1-naphthylamine, N,N-dibutyl-1-naphthylamine, 4-bromo-N,N-dimethyl-1-naphthylamine, and 4-chloro-N,N-dimethyl-1-naphthylamine. Preferably $p$ is 0 in formula II.

In the same manner, other 1-phenylpyrazole derivatives can be converted to the corresponding palladium-(II) chloride or bromide dimers. These can be substituted for the 2-(1-pyrazolyl)phenylpalladium(II) chloride dimer of Examples 2 and 4 and for the corresponding 3,5-dimethyl derivative of Example 6 to give products of the invention in which the aryl-amino portion corresponds to that of formula III. Such 1-phenylpyrazole derivatives include 4-bromo-1-phenylpyrazole, 4-chloro-1-phenylpyrazole, 4-pentyl-1-phenylpyrazole, 1,3,5-triphenylpyrazole, 1,4,5-triphenylpyrazole, 5-chloro-3-methyl-1-phenylpyrazole, 4-bromo-3-methyl-1,5-diphenylpyrazole, 3-methyl-1,5-diphenylpyrazole, 1-(p-chlorophenyl)pyrazole, 1-(o-tolyl)-pyrazole, 1-(p-bromophenyl)-3-methylpyrazole, 1-(p-chlorophenyl)-3-methyl-5-phenylpyrazole, and 4-bromo-1-(p-tolyl)-pyrazole. Preferably, because of availability of intermediates, $p$ is 0 in formula III, X″ is lower alkyl, and $n$ is at most 2.

Similarly, other 2-phenylpyridine derivatives can be converted to the corresponding palladium(II) chloride or bromide dimers, and these can be substituted for 2-(2-pyridyl)phenylpalladium(II) chloride in the process of Example 1 to give additional products of the invention in which the aryl-amino portion of the molecule corresponds to that of formula IV. Examples of such 2-phenylpyridine derivatives are 5-methyl-2-phenylpyridine, 3-ethyl-2-phenylpyridine, 3-methoxy-2-phenylpyridine, 2,4-diphenylpyridine, 3,4-dimethyl-2-phenylpyridine, 2-(m-tolyl)pyridine, 2-(o-methoxyphenyl)pyridine, 2-(p-bromophenyl)pyridine, 2-(p-chlorophenyl)pyridine, and 2-(p-chlorophenyl)-4,6-diphenylpyridine. Preferably $p$ is 0 in formula IV, X‴ is lower alkyl, and $m$ is 0 or 1. Most preferably $m$ is 0.

In addition, palladium(II) compounds of the general types represented by formulas I–IV and containing aryl-amino portions other than those specifically included in these formulas can be made and have the same beneficial combination of properties discussed above. The compounds include those in which the aryl-amino portion is derived from alkyl- and aryl-imino derivatives of aryl aldehydes, aryl alkyl ketones, and diaryl ketones, e.g., $C_6H_5CH = NCH_3$, $C_6H_5CH = NC_6H_5$, $C_6H_5C(CH_3) = NCH_3$, $(C_6H_5)_2C = NCH_3$, $C_6H_5C(CH_3) = NC_6H_5$, and $(C_6H_5)_2C = NC_6H_5$, together with other such imines with other lower alkyl groups in place of methyl and higher aryl or substituted aryl groups in place of phenyl. They also include those in which the aryl-amino portion is derived from 2-phenylquinoline, 1-phenyl-1,2,3-triazole, 1-phenyl-1,2,4-triazole, and substituted derivatives of each.

Scope of the "Chelate" Portion of the Molecule

Beta-diketones, beta-keto aldehydes, beta-keto esters, mono- and bis(hydrocarbylimino) derivatives of these three classes, tropolones, aminotroponeimines and salicylaldimines are known compounds. The compounds of these structural types that can form monovalent, bidentate chelate derivatives with metal ions by removal of one hydrogen per ligand, by processes discussed earlier, are well known to those skilled in the art. In general, for the types other than the tropolones, aminotroponeimines, and salicylaldimines, any compound in which the carbon between the two carbonyl carbons is bonded to at least one hydrogen and in which at most one of the carbonyl carbons is part of a ring will form chelates in this manner. The chelate portions of the molecules of the products of this invention can be derived from any such compounds. "Carbonyl carbon" as herein used means either of the carbon atoms bonded to carbonyl oxygen (= 0 or a hydrocarbylimino group (= NR′).

The preparation of beta-diketones and beta-keto aldehydes is described by Hauser, et al., in Chapter 3 of "Organic Reactions," Vol. VIII, edited by Adams, et al. Similarly, the preparation of beta-keto esters is described by Hauser and Hudson in Chapter 9 or Vol. I of "Organic Reactions" (Wiley, 1942). Beta-keto imines and their chelate-forming properties are discussed by Martin, et al., J. Am. Chem. Soc., 83, 73 (1961), and in "Inorganic Syntheses," Vol. XI, Ed. Jolly, pages 72 ff. (McGraw-Hill, 1968). Bis-(hydrocarbylimino) derivatives of beta-diketones and their conversion to metal chelates are described by Parks and Holm, Inorg. Chem., 7, 1408 (1968).

Operable beta-dicarbonyl compounds and hydrocarbylimino derivatives thereof, Ch—H, that can be used to form the chelate portion of the molecule include those of the formula

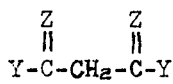

IX wherein the terms are as defined in formulas V–VII. Examples are 5-methyl-2,4-hexanedione, 7-methyl-2,4-nonanedione, 2,4-hexadecanedione, 1-(2-thienyl)-1,3-pentanedione, 1-phenyl-1,3-butanedione, 1-(p-tolyl)-1,3-butanedione, 1,3-bis(2,4,6-trimethylphenyl)-1,3-propanedione, 1-(4-bromophenyl)-1,3-butanedione, 1-(m-anisyl)-1,3-butanedione, 1-(2,5-diethoxyphenyl)-1,3-pentanedione, 1-(2-hydroxyphenyl)-1,3-butanedione, 1-(5-chloro-2-hydroxy)phenyl-1,3-butanedione, 1-(5-chloro-2-hydroxy-4-methylphenyl)-1,3-butanedione, 1,5-diphenyl-2,4-pentanedione, 1-phenyl-2,4-pentanedione, 1-(1- and 2-naphthyl)-1,3-butanedione, 1-(1-hydroxy-2-naphthyl)-1,3-butanedione, 1,1,1-trifluoro-2,4-pentanedione, 1,1,1,-5,5,5-hexafluoro-2,4-pentanedione, 3,5-heptanedione, 8-methyl-3,5-nonanedione, 4,6-nonanedione, 4-methyl-1-phenyl-1,3-pentanedione, 1-(2-tetrahydrofuryl)-1,3-butanedione, 1-cyclohexyl-1,3-butanedione, 1-(1,2,2,3-tetramethylcyclopentyl)-3-phenyl-1,3-propanedione, 1-phenyl-3-(2-thienyl)-1,3-propanedione, 1-(2-naphthyl)-3-phenyl-1,3-propanedione, 1-(3-methyl-5-oxazolyl)-1,3-butanedione, 1,3-bis(2-pyridyl)-1,3-propanedione, 1-(4-quinolyl)-1,3-butanedione, 1-phenyl-3-(3-pyridyl)-1,3-propanedione, 1-(6-methoxy-4-quinolyl)-1,3-butanedione, 3-oxobutanal, 5-methyl-3-oxohexanal, 4,4-dimethyl-3-oxopentanal, 3-oxo-4-phenylbutanal, 3-oxo-3-(p-anisyl)propanal, 3-(5-chloro-2-hydroxyphenyl)-3-oxopropanal, 3-(1-naphthyl)-3-oxopropanal, ethyl 3-oxobutanoate, t-butyl 3-oxobutanoate, phenyl 3-oxobutanoate, benzyl 3-oxobutanoate, ethyl 3-oxohexanoate, ethyl 3-cyclohexyl-3-oxopropanoate, methyl 3-oxo-3-phenylpropanoate, ethyl 3-(2-furyl)-3-oxopropanoate, ethyl 3-oxopentanoate, ethyl 3-(p-anisyl)-3-oxopropanoate, isobutyl 3-oxobutanoate, 4-phenylimino-2-pentanone, 4-(o-anisylimino)-2-pentanone, 4-(p-tolylimino)-2-pentanone, 4-(2,6-dimethylphenylimino)-2-pentanone, 4-(p-chlorophenylimino)-2-pentanone, 1-phenyl-3-phenylimino-1-butanone, 1,3-diphenyl-3-phenylimino-1-propanone, 4-phenylimino-2-butanone, 4-methylimino-2-pentanone ("enol" or "eneamine" form, 4-methylamino-3-penten-2-one), ethyl 3-phenyliminobutanoate, ethyl 3-(o-tolylimino) butanoate, 2-phenylamino-4-phenylimino-2-pentene, 2-(m-tolylamino)-4-(m-tolylimino)-2-pentene, 2-(p-biphenylylamino)-4-(p-biphenylylimino)-2-pentene, and 1-phenylamino-3-phenyliminopropene. The last four compounds are named as the "enol" or "eneamine" isomers. The corresponding "keto" or "aneimine" isomer for, e.g., the first compound is 2,4-bis(phenylimino)pentane (cf. formula IX). Regardless of which isomer predominates in this or any other type of ligand precursor Ch—H, the same metal chelate will be obtained, corresponding to formulas V–VII.

The more readily available compounds of formula IX are those in which Y is alkyl of at most 12 carbons; cycloalkyl of 5 or 6 ring carbons, lower fluoroalkyl; aryl of at most 10 carbons and containing up to two substituents selected from halo, lower alkyl, lower alkoxy, and hydroxyl; heterocyclyl of 5–6 nuclear atoms containing up to one such substituent; hydrogen, lower alkoxy, aryloxy of up to 10 carbons, and aralkoxy of up to 10 carbons, at most one Y being hydrogen, alkoxy, aryloxy or aralkoxy. Products of the invention in which the chelate portion contains such Y groups are therefore preferred. More preferably, Y is hydrogen, lower alkyl, cyclopentyl, cyclohexyl, trifluoromethyl, phenyl, naphthyl, thienyl, hydrogen, lower alkyoxy, phenoxy, or benzyloxy. Most preferably the chelate portion of the molecule is derived from a beta-diketone and Y is lower alkyl.

The more readily available hydrocarbylimino derivatives of beta-diketones, beta-keto aldehydes, and beta-keto esters, i.e., compounds of formula IX in which one Z is NR', are those in which R' is phenyl, optionally substituted with up to two inert substituents which can be lower alkyl, lower alkoxy, or halo, particularly chloro. These values of R' are therefore preferred in products of the invention of this type. Most preferably R', when present, is phenyl. In addition, of the three types of beta-dicarbonyl compounds, beta-diketones form hydrocarbylimino derivatives most readily, and therefore when one Z is NR' in formula IX, the Y groups are preferably other than hydrogen, alkoxy, aryloxy, and aralkoxy.

Tropolones are described, for example, by Nozoc in Chapter VII of "Non-Benzenoid Aromatic Compounds," edited by Ginsburg (Academic Press, 1959). Formation of metal chelates by tropolones is discussed here and also by Bryant, et al., J. Am. Chem. Soc., 75, 3784 (1953). Tropolones that are operable to produce chelating ligands, Ch, in the products of the present invention by loss of a hydrogen include tropolone represented by the formula

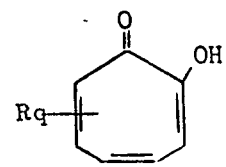

wherein R is chloro, bromo, lower alkyl or phenyl, and $q$ is 0, 1, 2 or 3; containing up to two or three inert substituents such as chloro, bromo, lower alkyl, and phenyl. Examples are tropolone, 4-isopropyltropolone, 3-bromotropolone, 3,5,7-tribromotropolone, 3-bromo-7- methyltropolone, 5-methyltropolone, 5-chlorotropolone, and 5-phenyltropolone. Preferably the number of substituents is zero or one.

Aminotroponeimines and the formation of metal chelates from them are described in Brasen and Howard, U.S. Pat. No. 3,052,705. Any of the aminotroponeimines described in this patent can be used to provide a chelate ligand, Ch, for a product of present invention by loss of a hydrogen. They are usually named as derivatives of 1,3,5-cycloheptatriene and are compounds of the formula

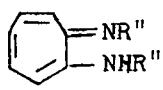

X wherein R" is hydrogen, alkyl, cycloalkyl, aralkyl, phenyl, or substituted phenyl. The preferred intermediates for use in preparing products of the present invention are compounds of formula X in which R" is hydrogen, lower alkyl, phenyl, chlorophenyl, lower alkoxyphenyl, and lower alkylphenyl. Examples are 1-amino-7-imino-1,3,5-cycloheptatriene, 1-butylamino-7-butylimino-1,3,5-cycloheptatriene, 1-phenylamino-7-phenylimino-1,3,5-cycloheptatriene, 1-(p-chlorophenylamino)-7-(p-chlorophenylimino)-1, 3,5-cycloheptatriene, 1-(o-anisylamino)-7-(o-anisylimino)-1,3,5-cycloheptatriene, and 1-(m-tolylamino)-7-(m-tolylimino)-1,3,5-cycloheptatriene.

Salicylaldimines are described, for example, by Harris and Livingstone in "Chelating Agents and Metal Chelates," Ed. Dwyer and Mellor, pages 119–120 (Academic Press, 1964), with references to original literature articles. Such compounds include those of the formula

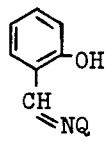

where Q is H, OH, alkyl, or aryl (preferably phenyl) optionally substituted with up to two inert substituents which can be halo, lower alkyl, or lower alkoxy. Examples are salicylaldimine, N-hydroxysalicylaldimine, N-methylsalicylaldimine, N-phenylsalicylaldimine and N-p-tolylsalicylaldimine.

The palladium compounds of this invention are useful in the preparation of palladium films on various substrates. Precious metal decorating compounds generally comprise, in addition to metal compounds (in this case a palladium compound of this invention), a flux and an organic solvent. These components are admixed conventionally. The particular solvent and flux used is a matter of choice. Viscosifying agents, such as pine rosin, may be added. In order to illustrate this utility, the following example is presented.

EXAMPLE 11

A precious metal decorating composition was prepared from the palladium compound of Example 7. The composition contained 20.82% gold resinate (45.8% gold); 4.77% palladium compound of Example 7; 21.59% solvent (about 25% of a mixture of chlorobenzene and xylene and about 75% of a mixture of alpha and beta pinene); 10.00% viscosifying agent (90% pine rosin and 10% flowers of sulfur); 9.35% chlorobenzene; 20.56% mixture of alpha and beta pinene; 0.50% red dye; 1.00% vanadium resinate; 0.80 % chromium resinate; 4.00% bismuth resinate; and 7.00% rhodium resinate.

This composition was brushed onto the china plate and fired to 740°C.–750°C. A bright, specular, silvery film of palladium was formed. The palladium compounds of this invention have a wide range of coating applications on various substrates, e.g., glass, china, ceramics, metal, etc.

As many apparently widely different embodiments of this invention may be made without departing from the spirit and scope thereof, it is to be understood that this invention is not limited to the specific embodiments thereof except as defined in the appended claims.

I claim:

1. A bis-chelate derivative of palladium which may be represented by a formula selected from the class consisting of I 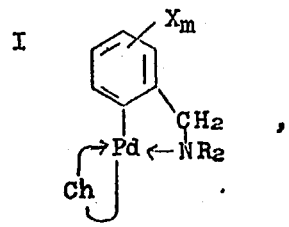

II 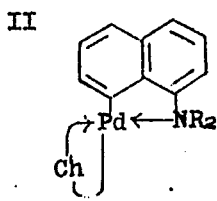

III 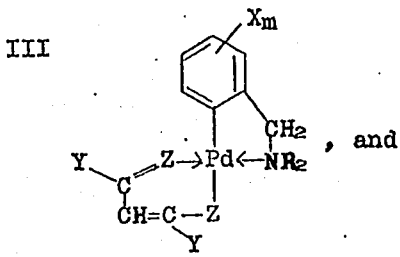 , and

IV 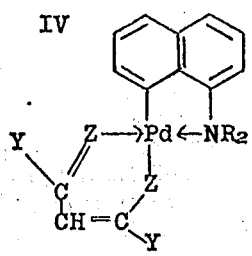

wherein
Pd represents palladium in the +2 oxidation state;
R is lower alkyl, where at least one R group is bonded to nitrogen through a carbon which is bonded to at least two hydrogens;
X is selected from the class consisting of lower alkyl, lower alkoxy, F, Cl and Br;
$m$ is selected from the class consisting of 0, 1, and 2;
Ch is a monovalent, bidentate chelate ligand having up to and including 30 carbon atoms formed by removal of an acidic hydrogen from a chelating position of a compound selected from the class consisting of

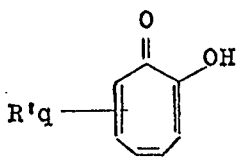

wherein
R' is chloro, bromo, lower alkyl or phenyl and $q$ is 0, 1, 2, or 3;

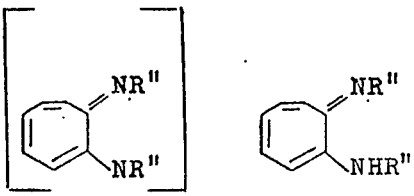

wherein
R" is hydrogen, alkyl, cycloalkyl, aralkyl, phenyl or chlorophenyl, lower alkoxyphenyl, and lower alkylphenyl; and

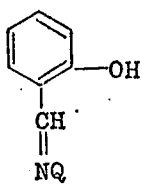

wherein
Q is H, OH, alkyl, or aryl which may contain up to two inert substituents selected from the group halo, lower alkyl and lower alkoxy;
Z is selected from the class consisting of O and NR''', R''' being lower alkyl, or aryl, the two Z groups being the same or different; the Y groups are the same or different and are hydrogen, alkyl, cycloalkyl, lower fluoroalkyl, aryl, alkoxy, aryloxy, or arylalkoxy, at most one of them being hydrogen, alkoxy, aryloxy, or arylalkoxy, and wherein the aryl group can contain inert substituents selected from halo, lower alkyl and lower alkoxy.

2. The bis-chelate derivative of palladium of claim 1 which has the formula

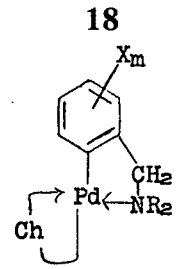

3. The bis-chelate derivative of palladium of claim 1 which has the formula

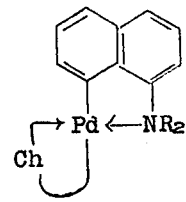

4. the bis-chelate derivative of palladium of claim 1 which has the formula

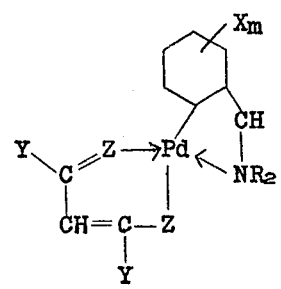

5. The bis-chelate derivative of palladium of claim 4 wherein one Y group is alkyl.
6. The bis-chelate derivative of palladium of claim 5 wherein the other Y group is alkyl.
7. The bis-chelate derivative of palladium of claim 5 wherein the other Y group is alkoxy.
8. The bis-chelate derivative of palladium of claim 1 which has the formula

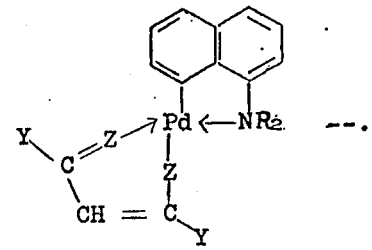

9. The bis-chelate derivative of palladium of claim 8 wherein both Y's are alkyl.
10. The bis-chelate derviative of palladium of claim 6 which is 2,2,6,6-tetramethyl-3,5-heptanedionato-2-(dimethylaminomethyl)phenylpalladium(II).
11. A bis-chelate derivative of palladium according to claim 9 which is 2,2,6,6-tetramethyl-3,5-heptanedionato-8-(dimethylamino)-1-naphthylpalladium(II).

12. A bis-chelate derivative of palladium according to claim 6 which is 2,4-pentanedionato-(2-dimethylaminomethyl)-phenylpalladium(II).

13. A bis-chelate derivative of palladium according to claim 7 which is (ethyl 3-oxobutanoato)-2-(dimethylaminomethyl)-phenylpalladium(II).

14. A bis-chelate derivative of palladium according to claim 6 which is (4-phenylimino-2-pentanonato)-2-(dimethylaminoethyl)phenylpalladium(II).

* * * * *